United States Patent
Wang

(10) Patent No.: US 11,488,468 B1
(45) Date of Patent: Nov. 1, 2022

(54) SENSOR FOR DETECTING THE PROXIMITY OF AN IEEE 802.11 PROTOCOL CONNECTABLE DEVICE

(71) Applicant: Focus Universal Inc., Ontario (CA)

(72) Inventor: Desheng Wang, Diamond Bar, CA (US)

(73) Assignee: Focus Universal Inc., Ontario (CA)

( * ) Notice: Subject to any disclaimer, the term of this patent is extended or adjusted under 35 U.S.C. 154(b) by 0 days.

(21) Appl. No.: 16/777,632

(22) Filed: Jan. 30, 2020

(51) Int. Cl.
*G08B 25/10* (2006.01)
*G08B 3/10* (2006.01)
*H04W 4/80* (2018.01)

(52) U.S. Cl.
CPC .............. *G08B 25/10* (2013.01); *G08B 3/10* (2013.01); *H04W 4/80* (2018.02)

(58) Field of Classification Search
CPC ................... G08B 25/10; G08B 3/10
See application file for complete search history.

(56) References Cited

U.S. PATENT DOCUMENTS

| 2006/0019718 | A1* | 1/2006 | Kuo ........................ H04M 1/05 370/328 |
| 2007/0015537 | A1* | 1/2007 | DeBiasio ............ H04M 1/6091 455/556.1 |
| 2009/0186581 | A1* | 7/2009 | Griffin, Jr. .......... H04M 1/6091 455/131 |
| 2011/0095600 | A1* | 4/2011 | Sayed .................. H02J 7/0042 307/9.1 |
| 2015/0325124 | A1* | 11/2015 | Fern ................. G08G 1/096775 340/905 |

* cited by examiner

*Primary Examiner* — David Bilodeau
(74) *Attorney, Agent, or Firm* — Knobbe, Martens, Olson & Bear, LLP

(57) ABSTRACT

Disclosed is a sensor for detecting the proximity of smart devices previously connected to the sensor using the IEEE 802.11 protocols. Importantly, the sensor does not operate using a Bluetooth® connection, which would require the smart devices previously connected to the sensor using the IEEE 802.11 protocols to also have Bluetooth® protocols enabled. Enabling such Bluetooth® protocols uses more battery than having the IEEE 802.11 protocol adapter enabled. The sensor references a list of previously connected smart devices and attempts to connect with any in range, if none can be connected to, the sensor emits an audible alarm signal. Further, no application is required for the sensor to operate.

20 Claims, 2 Drawing Sheets

SENSOR FOR DETECTING THE PROXIMITY OF AN IEEE 802.11 PROTOCOL CONNECTABLE DEVICE

CROSS-REFERENCE TO RELATED APPLICATIONS

Not Applicable

STATEMENT RE: FEDERALLY SPONSORED RESEARCH/DEVELOPMENT

Not Applicable

BACKGROUND

1. Field

The present invention relates to a device for detecting the proximity of an IEEE 802.11 protocol connectable device.

2. Background

Use of mobile devices which typically connect to local area networks using a IEEE 802.11 protocol are a constant for many users in every day life. The most prevalent may be the smart phone. While most users have a smart phone for making calls, they typically use these devices as small computers as well. In order to get more reliable data connections to the internet, users often prefer to connect to a local area network and out through the local area network to the internet, rather than using less reliable and potentially lower bandwidth cellular connections. For this reason, most users leave their WiFi® service, which used the IEEE 802.11 protocol, on their smartphone active.

However, because users tend to turn to their smart phones for a myriad of tasks, they often set their smart phone down where they last used it. This can mean more easily forgetting their smart phone. A user may get in a car and leave their phone behind. When this happens at home it's an inconvenience, when this happens at a commercial establishment, it may have more serious consequences.

A common denominator with both leaving the house and a commercial location in many areas is an automobile. Almost all automobiles have a power source accessible to a user, in fact, many users purchase and user power adapters to charge their phone while in the car.

For the foregoing reasons, there is a need for a device which can notify a user that their smart device is not in the car with them.

BRIEF SUMMARY

Disclosed herein is a sensor for detecting the proximity of a wireless connectable smart device using the IEEE 802.11 protocols. The sensor may include a housing. The housing may include a distal end portion and a proximal end portion. The distal end portion may be configured to be placed in an automotive cigarette lighter, and the proximal end portion may include one or more power sockets for connecting one or more charging cables. The sensor may further include interface surfaces on the distal end portion to draw power from the cigarette lighter. The sensor may further include a power supply. The power supply may be connected to the interface surfaces. The power supply may regulate the voltage of the power. The sensor may further include a transceiver using the IEEE 802.11 protocols. The transceiver may be located in the housing. The transceiver may be electrically connected to the power supply. The transceiver may be configured to connect to IEEE 802.11 protocol capable smart devices within range of the transceiver. The sensor may further include a processor. The processor may be located in the housing and electrically connected to the transceiver. The sensor may further include a memory located in the housing. The memory may be electrically connected to the processor. The memory may have instructions stored on it for execution on the processor. The sensor may have an audio circuit electrically connected to the processor. The audio circuit may include an audio driver for generating audible sounds. The instructions stored on the memory may include instructions that when the automobile is started and power is provided to the transceiver, the instructions cause the transceiver to search for, and connect to, smart devices previously connected to the sensor using the IEEE 802.11 protocols. If the transceiver fails to connect to any previously connected smart devices using the IEEE 802.11 protocols, the instructions cause the audio circuit to emit an audible alarm.

Further disclosed is a method for manufacturing a sensor for detecting the proximity of a smart device connectable to a transceiver using IEEE 802.11 protocols. The method may include forming a housing. The housing may include a distal end portion. The distal end portion may be configured to be placed in an automotive cigarette lighter, and the housing may define an interior of the housing. The method may further include adding a transceiver to the interior of the housing. The transceiver may use IEEE 802.11 protocols to connected to IEEE 802.11 protocol capable smart devices within range of the transceiver. The method may further include adding a processor to the interior of the housing. The processor may be electrically connected to the transceiver. The method may further include adding a memory to the interior of the housing. The memory may be electrically connected to the processor. The memory may have instructions stored on it for execution on the processor. The method may further include adding an audio circuit electrically connected to the processor. The audio circuit may include an audio driver for generating audible sounds. The instructions stored on the memory may include instructions that when the automobile is started and power is provided to the transceiver, the instructions may cause the transceiver to search for, and connect to, smart devices previously connected to the sensor using the IEEE 802.11 protocols. If the transceiver fails to connect to any previously connected smart devices using the IEEE 802.11 protocols, the instructions may cause the audio circuit to emit an audible alarm.

Further disclosed is a sensor for detecting the proximity of a wireless connectable smart device using the IEEE 802.11 protocols. The sensor may include a housing. The housing may include a distal end portion. The distal end portion may be configured to be placed in an automotive cigarette lighter. The housing may define an interior of the housing. The sensor may further include interface surfaces on the distal end portion. The interface surfaces may draw power from the cigarette lighter. The sensor may further include a transceiver which may use the IEEE 802.11 protocols, The transceiver may be located in the interior of the housing and may be electrically connected to the interface surfaces. The transceiver may be configured to connect to IEEE 802.11 protocol capable smart devices within range of the transceiver. The sensor may further include a processor. The processor may be located in the housing and may be electrically connected to the transceiver. The sensor may further include a memory. The memory may be located in the housing and may be electrically connected to the processor. The memory may have instructions stored on it for execution on the processor. The sensor may further have an audio circuit, which may be electrically connected to the processor. The audio circuit may include an audio driver for generating audible sounds. The instructions stored on the memory may include instructions that when the automobile is started and power is provided to the transceiver, the instructions may cause the transceiver to search for, and connect to, smart devices previously connected to the sensor using the IEEE 802.11 protocols. If the transceiver fails to connect to any previously connected smart devices using the IEEE 802.11 protocols, the instructions may cause the audio circuit to emit an audible alarm.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

The detailed description set forth below in connection with the appended drawings is intended as a description of the presently preferred embodiment of a device to notify a user when an IEEE 802.11 protocol connectable smart device is not in an automobile, and is not intended to represent the only form in which it can be developed or utilized. The description sets forth the functions for developing and operating the system in connection with the illustrated embodiments. It is to be understood, however, that the same or equivalent functions may be accomplished by different embodiments that are also intended to be encompassed within the scope of the present disclosure. It is further understood that the use of relational terms such as first, second, distal, proximal, and the like are used solely to distinguish one from another entity without necessarily requiring or implying any actual such relationship or order between such entities.

Disclosed is a sensor for detecting the proximity of a wireless connectable smart device using the IEEE 802.11 protocols, such as those used for WiFi® communication. The sensor only uses the IEEE 802.11 protocols in order to achieve two important ends. First, the IEEE 802.11 protocols offer a reliable way to search for, and connect to, devices in range which also use the IEEE 802.11 protocols. As used herein, the term smart device is meant to include any device which uses the IEEE 802.11 protocols to connect to another device. Typically, users with smart devices with such a capability leave this capability turned on. This fact points to the second important end. That is, other prior art sensors typically operate using Bluetooth® protocols. However, operating using Bluetooth® protocols is only effective if the smart device is Bluetooth® protocol capable, and has the Bluetooth® capability turned on. Activating Bluetooth® capability typically results in a significant battery drain of the smart device. In order to conserve battery power, many users do not activate Bluetooth® connectivity on their smart devices. If this connectivity is not activated on the smart device, it renders the sensor useless. Thus, the disclosed sensor operates using IEEE 802.11 protocols.

Figure 1:
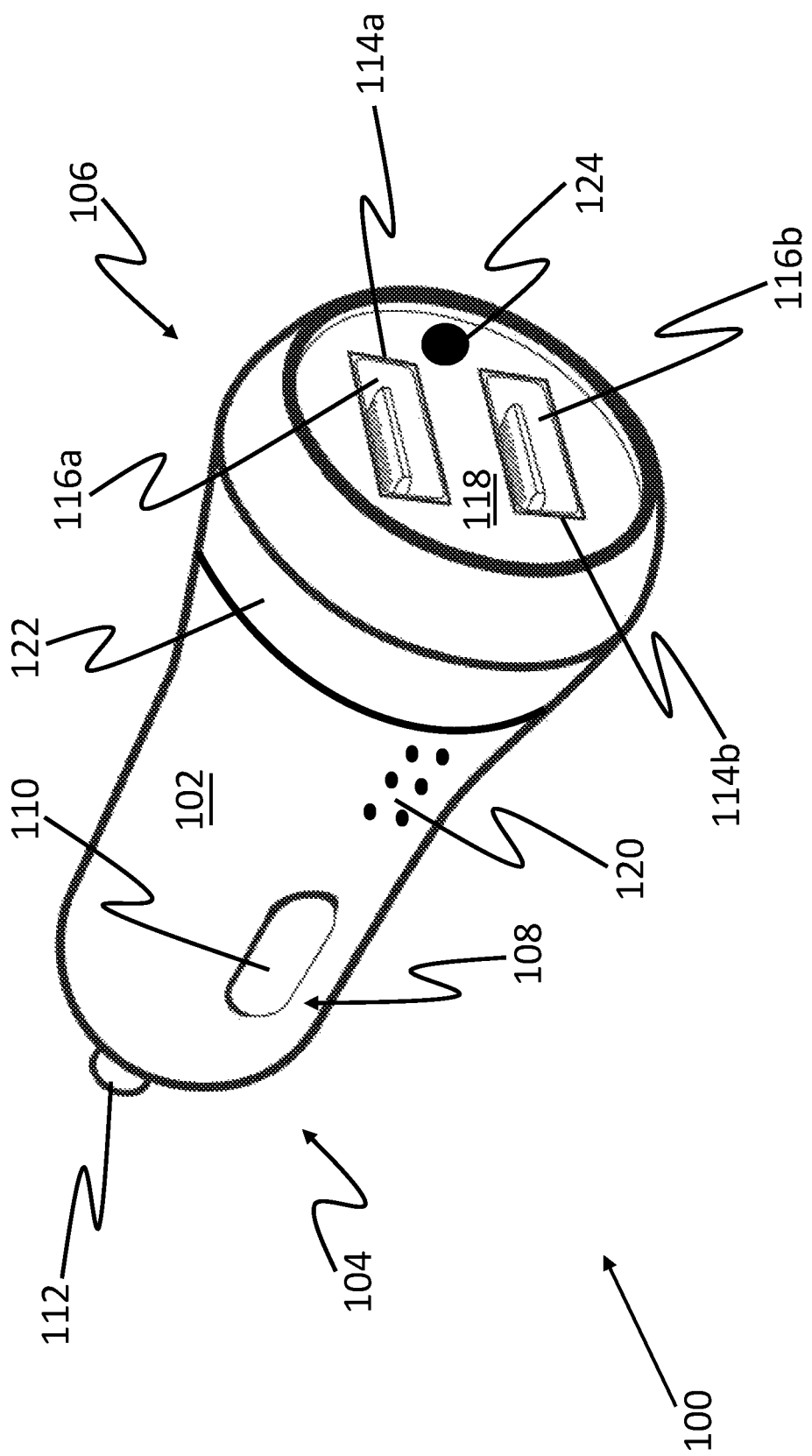
FIG. 1 shows a perspective view of one embodiment of the sensor.

With reference to FIG. 1, the sensor 100 may take the general form of a power adapter which plugs in to an automotive cigarette lighter or similarly shaped power socket. The sensor may include a housing 102 formed from a plastic or similar material. For example, such a housing 102 may be formed using an injection molding process.

The housing 102 may have a distal end portion 104 and a proximal end portion 106. The distal end portion 104 may be shaped to fit in to, and connect with, the automotive cigarette lighter or power adapter. To that end, the distal end portion 104 may include interface surfaces 108. Specifically, the distal end may have a plurality of plates 110 which extend past an exterior surface of the housing 102 and abut the shell of the cigarette lighter or power adapter, when the sensor 100 is inserted, thereby providing at least partial connectivity to the electricity flowing to the cigarette lighter or power socket. The plates 110, or shell interface surfaces, may be leaf springs or may be spring loaded. The distal end portion 104 may further include a spring-loaded tip 112 which connects to a center contact of the cigarette lighter or power socket. The center contact may be positive and the shell negative or vice versa. Thus, the interface surfaces 108 allow the sensor 100 to draw electrical power from the cigarette lighter or power socket.

The proximal end portion 106 of the housing 102 may include openings 114a, 114b in which power ports 116a, 116b for charging cables may be placed. For example, these power ports 116a, 116b may be configured to accept a plug which complies with the universal serial bus standard. Alternatively, the power ports 116a, 116b may be configured to accept a plug of a different standard. A proximal end surface 118 of the housing 102 may be generally planar to make the placement of, and connection with, the power ports 116a, 116b easier. The proximal end portion 106 may further include an aperture 120 in the housing 102 for an audio driver's signal to pass. For example, the aperture 120 may be configured with the same shape as the perimeter of the audio driver, and the aperture 120 may have a screen across it. Alternatively, the aperture 120 may be a pattern of perforated holes placed in a location on the proximal end portion 106. The audio driver may be placed inside the housing 102 and the perforated holes allow the audio signal to pass through to the exterior of the housing 102.

The proximal end portion 106 may also include a visual indicator 122. For example, the visual indicator 122 may be a light emitting diode (LED), a small fluorescent lamp, or a small neon lamp. The visual indicator 122 may be any shape. In some embodiments the visual indicator 122 may be a ring around the housing. As will be discussed in more detail below regarding the operation of the sensor 100, the visual indicator 122 may operate in conjunction with the audio driver. Both may activate and emit in order to send an indication of a condition of operation of the sensor 100. Alternatively, there may be more than one visual indicator 122 on the proximal end portion 106. Each of the visual indicators 122 may signal a different operating condition of the sensor 100 when activated. Still further alternatively, one visual indicator 122 may have more than one color state. For example, the visual indicator 122 may indicate a first operational state when illuminated as a first color, and a second operational state when illuminated with a second color.

Additionally, the proximal end portion 106 may include a control surface 124 which may be actuated by a user. The control surface 124 may, for example, be a button or a switch. The control surface 124 may be electrically connected to the processor, so that when a user actuates the control surface 124, a signal is sent to the processor. Instructions on the memory may interpret this signal as an indicator to cancel the audio signal or visual indicator 122 activation, or both. This way, if the user intended for no smart devices to the be present, the user is not forced to either unplug the sensor 100 or listen to the audio, look at the activated visual indicator 122, or both.

Figure 2:
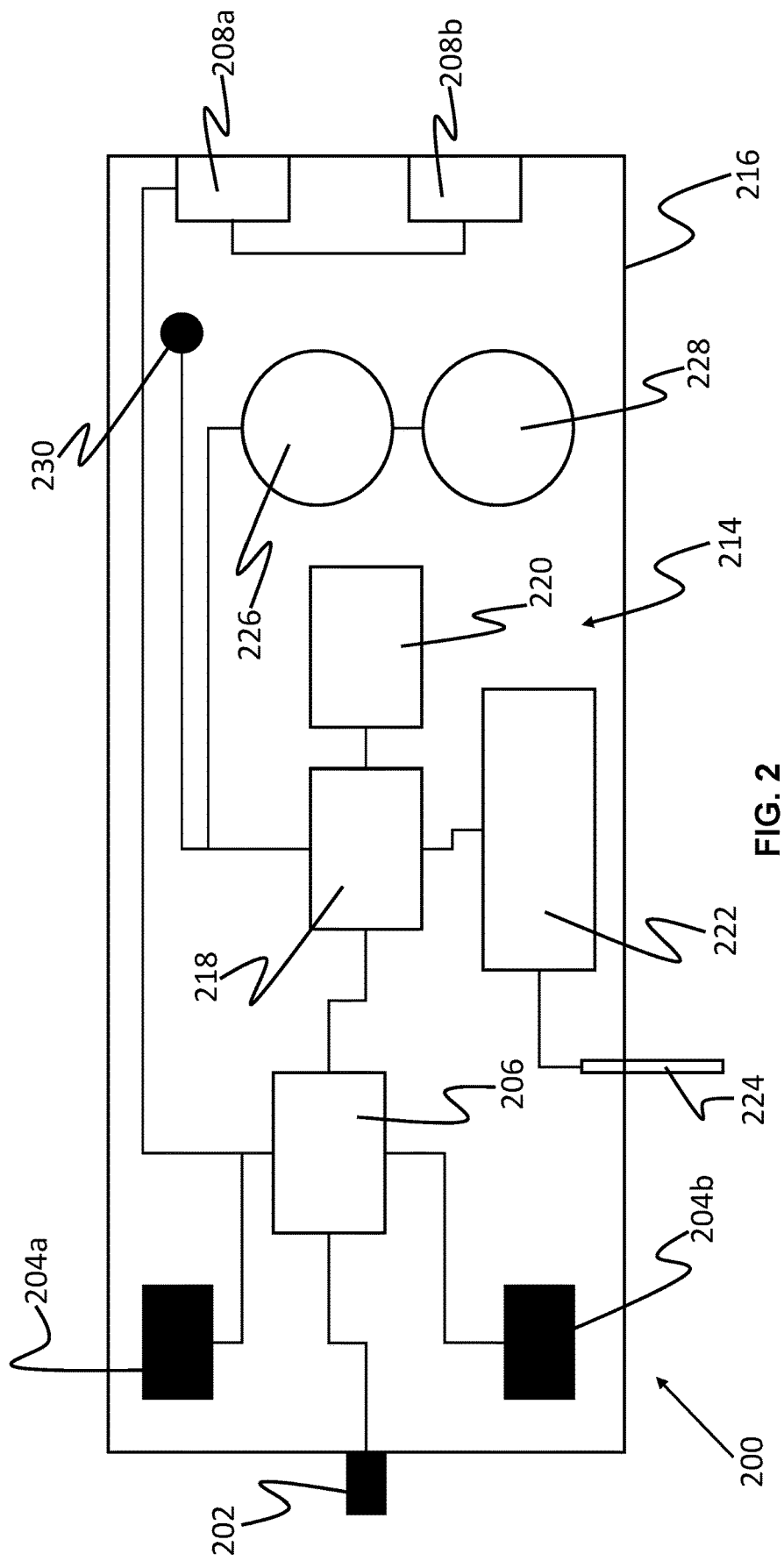
FIG. 2 shows a schematic diagram of an exemplary sensor.

With reference to FIG. 2, the sensor 200, is an electrical device. Electrically, the interface surfaces, including the center contact interface surface 202, and the shell interface surfaces 204a, 204b, may be connected to a power supply 206. All the of the electrical components and circuitry with the exception of the interface surfaces 202, 204a, 204b, the power ports 208a, 208b, the audio driver 210, and the visual indicator 212 are located entirely in an interior 214 defined by the housing 216. The power supply 206 may regulate voltage from the 12 volts supplied by the car battery. The regulated voltage is required for proper operation of the sensitive electronic components in the sensor 200. The power supply 206 may be electrically connected to the remainder of the components or sub-circuits on the sensor 200.

The sensor 200 may include a processor. The processor 218 may be electrically connected to a memory 220 which may include instructions which are executed on the processor 218. The processor may be composed of multiple processor chips, with each chip performing separate assigned functions. For example, one processor chip may perform IEEE 802.11 encoding, and another processor chip may perform general device operations functions. The instructions which may be stored on the memory 220 and executed on the processor 218 are described in greater detail below with regard to the operation of the sensor 200. The processor 218 and the memory 220 may receive power from the power supply 206, either directly or indirectly. All the components of the sensor 200, including the processor 218 and memory 220 may be mounted on a printed circuit board (not shown), which may be configured to more easily fit all the components in the housing 216.

The processor 218 may be connected to a transceiver 222. The transceiver 222 may be configured to transmit and receiver IEEE 802.11 protocol configured transmissions in order to communicate with other devices wirelessly. These protocols may be stored on the memory 220, and executed on the processor 218 to operate the transceiver 222. The transceiver 222 may receive power from the power supply 206, as with the other components. The transceiver 222 may be shielded against interference from other components in the sensor 200. The transceiver 222 may include an antenna 224. The antenna 224 may be internal to the housing 216 or external of the housing 216. If the antenna 224 is external to the housing 216, the positioning of the antenna 224 may be adjustable.

The processor 218 may also be connected to a circuit or sub-circuit which includes the audio driver 226 and a circuit or sub-circuit which includes the visual indicator 228. Again, in some embodiments, there may be more than one visual indicator 228. The circuits or sub-circuits with the audio driver 226 and visual indicator 228 may be connected to the processor 218. In some embodiments, the audio driver 226 and the visual indicator 228 may be part of the same circuit or sub-circuit. These circuits or sub-circuits may include switches controlled by the processor 218. The switches control current flow to the audio driver 226 or to the visual indicator 228. When no current is flowing, no sound is emitted or visual indicators active. When current is flowing through the switch or switches, a signal is emitted from the audio driver 226 or the visual indicator 228 is active, or both.

In operation, power flows to the sensor 200 when the vehicle is started. If the vehicle is not running, typically the cigarette lighter or power socket has no power when the vehicle is not running in order to preserve the vehicle battery. Once the vehicle is running, power is routed to the cigarette lighter or power socket in to which the sensor 200 is plugged. The sensor 200 receives this power, and uses it for operation. The power is obtained by the interface surfaces 202, 204a, 204b and may have the voltage regulated by the power supply 206. The power may flow from the power supply 206, if one is present, to the various components.

Once the memory 220 and processor 218 receive instructions, the processor 218 may execute instructions which cause the IEEE 802.11 protocol transceiver 222 to begin searching for each of the smart devices stored on a list in the memory 220.

There may be further instructions which set parameters for this search. For example, the transceiver 222 may first check for any local area networks in range, if it finds at least one IEEE 802.11 protocol based local area network in range, the instructions may specify for the transceiver 222 to stop searching until the transceiver 222 no longer detects the local area network. The reason behind this instruction is that a smart device may only connect to one transceiver at a time. It may be very likely that the smart device is within range of both the local area network router and the transceiver 222 in the sensor 200. It is further very likely that the smart device is connected to the local area network and the transceiver 222 on the sensor 200 will only be able to connect with the smart device when the local area network is no longer in range of the smart device.

Further, the list of smart devices in the memory 220 itself may be a parameter. The transceiver 222 may only search for the smart devices on the list. Alternatively, the instructions stored on the memory 220 may cause the transceiver 222 to only search for only a portion of smart devices on the list. Alternatively, the memory 220 may include instructions which truncate the total time the transceiver 222 searches for the smart devices on the list. Each of these may speed the operation of the transceiver 222 and allow a user to become aware that a smart device is not in range of the sensor 200 sooner. This helps the user in various ways. For example, if the smart device is a smart phone, and the user left it at home and is driving away, the sensor 200 may alert the user to the fact sooner rather than later, making it easier for the user to return home and pick up the smart phone.

The transceiver 222 may search all the smart devices on the list. If the transceiver 222 does not connect to any of the smart devices on the list, the transceiver 222 may send a signal notifying the processor 218 of this condition. The instructions stored in the memory 220 may cause the processor 218 to send a signal to actuate the switch or switches which provide power to the audio driver 226 and visual indicator 228. This will alert the user to the condition that none of the smart devices on the list could be connected to the transceiver 222. The visual indicator 228 may light up only when no smart devices from the list could be connected. For example, the visual indicator 228 may be red when no smart devices could be connected.

Alternatively, the visual indicator 228 may use some, or all, of additional possible colors. For example, one embodiment of the sensor 200 may display a green light as a visual indicator 228 upon power up and when a device is connected. This same, or another, visual indicator may light yellow when the transceiver 222 is searching for smart devices. Finally, the same or another visual indicator 228 may light red when none of the smart devices on the list are connected. The memory 220 may include various instructions for execution on the processor 218 which cause various switches within the sensor 200 to be actuated to control the color changing of the visual indicator 228, or to turn various visual indicators 228 on and off in embodiments where more than one used.

The user may use a control surface 230 to send a signal to the processor 218 ending the audio signal, the activation of the visual indicator 228, or both. Alternatively, the control surface 230 may be used to reset the processor. Thus, a first or second press, when the first press ends the audio signal, the activation of the visual indicator 228, or both, of the control surface 230 may cause the instructions to reset the sensor 200, and the search to start over again. When the processor 218 has more than one processor chip, there may be a separate control surface for resetting each portion of the chip. For example, when the sensor 200 includes a main processor chip, and a WiFi® processor chip, the main processor chip may have a first control surface for resetting the main processor chip, and a second control surface for resetting the WiFi® processor chip. In addition, shutting off power to the sensor 200, for example, by turning off the vehicle, will cause the sensor 200 to reset, as well. The control surface 230 may be a button, a switch, a knob, or any mechanical or electrical, or combination thereof, component which will cause power to disconnect from the intended component.

Additionally, the memory 220 may store instructions which allow the sensor 200 to connect with a smart device for the purpose of changing various parameters of the sensor 200. These parameters may be stored in the memory 220 and may include the list of smart devices for which the sensor 200 is to search, the amount of time the sensor 200 is to spend searching for the smart devices on the list, and whether to toggle on or off a check for local area networks before performing a search for the smart devices stored in the list in the memory 220 of the sensor 200. The changes may be made by a user via a graphical user interface which is stored on the smart device. The graphical user interface may be part of an application stored on the smart device or may be created in real time by instructions stored on the memory 220 of the sensor 200.

The above description is given by way of example, and not limitation. Given the above disclosure, one skilled in the art could devise variations that are within the scope and spirit of the invention disclosed herein, including various ways of organizing visual indicators. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A sensor for detecting the proximity of a wireless connectable smart device using the IEEE 802.11 protocols, comprising:
    a housing including a distal end portion and a proximal end portion, the distal end portion being configured to be placed in an automotive cigarette lighter, and the proximal end portion including one or more power sockets for connecting one or more charging cables;
    interface surfaces on the distal end portion to draw power from the cigarette lighter;
    a power supply connected to the interface surfaces, the power supply regulating the voltage of the power;
    a transceiver using the IEEE 802.11 protocols located in the housing and electrically connected to the power supply, the transceiver configured to connect to IEEE 802.11 protocol capable smart devices within range of the transceiver;
    a processor located in the housing and electrically connected to the transceiver;
    a memory located in the housing and electrically connected to the processor, the memory having instructions stored on it for execution on the processor; and
    an audio circuit electrically connected to the processor, the audio circuit including an audio driver for generating audible sounds;
    wherein, the instructions stored on the memory include instructions that when the automobile is started and power is provided to the transceiver, the instructions cause the transceiver to search for, and connect to, smart devices previously connected to the sensor using the IEEE 802.11 protocols, and if the transceiver fails to connect to any previously connected smart devices using the IEEE 802.11 protocols, the instructions cause the audio circuit to emit an audible alarm.

2. The sensor of claim 1, further comprising a visual indicator which lights when the audible alarm is emitted.

3. The sensor of claim 1, further comprising a visual indicator which lights a first color when power is flowing to the sensor, and changes to a second color when the audible alarm is emitted.

4. The sensor of claim 1, wherein the memory further includes a list of local area networks, and when the sensor is powered, the instructions stored on the memory cause the transceiver to search for the local area networks, and if any are seen, to not perform the search for smart devices previously connected to the sensor using the IEEE 802.11 protocols.

5. The sensor of claim 4, further comprising instructions on the memory which allow a smart device connected using IEEE 802.11 protocols to be able to add and remove smart devices from a list of previously connected smart devices in the memory of the sensor.

6. The sensor of claim 5, further comprising instructions on the memory which allow a smart device connected using IEEE 802.11 protocols to be able to add and remove local area networks from the list of local area networks.

7. The sensor of claim 1, wherein the previously connected smart devices using IEEE 802.11 protocols is limited to a list of 10 smart devices.

8. A method for manufacturing a sensor for detecting the proximity of a smart device connectable to a transceiver using IEEE 802.11 protocols, comprising:
    forming a housing, the housing including a distal end portion, the distal end portion being configured to be placed in an automotive cigarette lighter, and the housing defining an interior of the housing;
    adding a transceiver to the interior of the housing, the transceiver using IEEE 802.11 protocols to connected to IEEE 802.11 protocol capable smart devices within range of the transceiver;
    adding a processor to the interior of the housing, the processor electrically connected to the transceiver;
    adding a memory to the interior of the housing, the memory being electrically connected to the processor, the memory having instructions stored on it for execution on the processor; and adding an audio circuit electrically connected to the processor, the audio circuit including an audio driver for generating audible sounds;

wherein, the instructions stored on the memory include instructions that when the automobile is started and power is provided to the transceiver, the instructions cause the transceiver to search for, and connect to, smart devices previously connected to the sensor using the IEEE 802.11 protocols, and if the transceiver fails to connect to any previously connected smart devices using the IEEE 802.11 protocols, the instructions cause the audio circuit to emit an audible alarm.

9. The method of claim 8, wherein the memory further includes a list of local area networks, and when the sensor is powered, the instructions stored on the memory cause the transceiver to search for the local area networks, and if any are seen, to not perform the search for smart devices previously connected to the sensor using the IEEE 802.11 protocols.

10. The method of claim 9, further comprising instructions on the memory which allow a smart device connected using IEEE 802.11 protocols to be able to add and remove smart devices from a list of previously connected smart devices in the memory of the sensor.

11. The method of claim 10, further comprising instructions on the memory which allow a smart device connected using IEEE 802.11 protocols to be able to add and remove local area networks from the list of local area networks.

12. The method of claim 8, further comprising adding a visual indicator on an exterior of the housing, the visual indicator lighting a first color when power is flowing to the sensor, and changing to a second color when the audible alarm is emitted.

13. A sensor for detecting the proximity of a wireless connectable smart device using the IEEE 802.11 protocols, comprising:

a housing including a distal end portion, the distal end portion being configured to be placed in an automotive cigarette lighter, the housing defining an interior of the housing;

interface surfaces on the distal end portion, the interface surfaces drawing power from the cigarette lighter;

a transceiver using the IEEE 802.11 protocols, the transceiver located in the interior of the housing and electrically connected to the interface surfaces, the transceiver configured to connect to IEEE 802.11 protocol capable smart devices within range of the transceiver;

a processor located in the housing and electrically connected to the transceiver;

a memory located in the housing and electrically connected to the processor, the memory having instructions stored on it for execution on the processor; and an audio circuit electrically connected to the processor, the audio circuit including an audio driver for generating audible sounds;

wherein, the instructions stored on the memory include instructions that when the automobile is started and power is provided to the transceiver, the instructions cause the transceiver to search for, and connect to, smart devices previously connected to the sensor using the IEEE 802.11 protocols, and if the transceiver fails to connect to any previously connected smart devices using the IEEE 802.11 protocols, the instructions cause the audio circuit to emit an audible alarm.

14. The sensor of claim 13, further comprising one or more charging ports located on a proximal end of the housing.

15. The sensor of claim 13, wherein the previously connected smart devices using IEEE 802.11 protocols is limited to a list of 10 smart devices.

16. The sensor of claim 13, wherein the memory further includes a list of local area networks, and when the sensor is powered, the instructions stored on the memory cause the transceiver to search for the local area networks, and if any are seen, to not perform the search for smart devices previously connected to the sensor using the IEEE 802.11 protocols.

17. The sensor of claim 16, further comprising instructions on the memory which allow a smart device connected using IEEE 802.11 protocols to be able to add and remove smart devices from a list of previously connected smart devices in the memory of the sensor.

18. The sensor of claim 17, further comprising instructions on the memory which allow a smart device connected using IEEE 802.11 protocols to be able to add and remove local area networks from the list of local area networks.

19. The sensor of claim 13, further comprising adding a visual indicator on an exterior of the housing, the visual indicator lighting a first color when power is flowing to the sensor, and changing to a second color when the audible alarm is emitted.

20. The sensor of claim 13, wherein the transceiver searches for smart devices previously connected to the sensor using the IEEE 802.11 protocols for a maximum of 10 seconds.

* * * * *